Oct. 9, 1962   C. B. BRAHM   3,057,170
AIR CONDITIONING OVERLOAD PROTECTOR
Filed Dec. 5, 1958   3 Sheets-Sheet 2
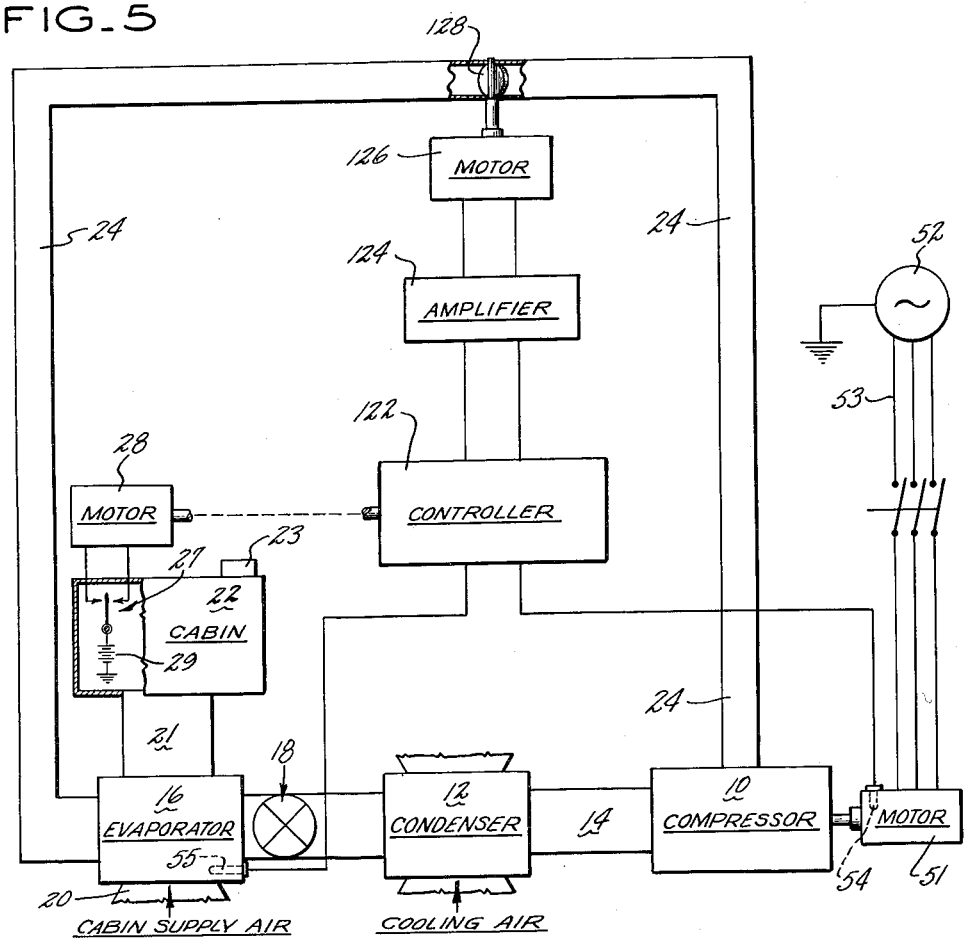
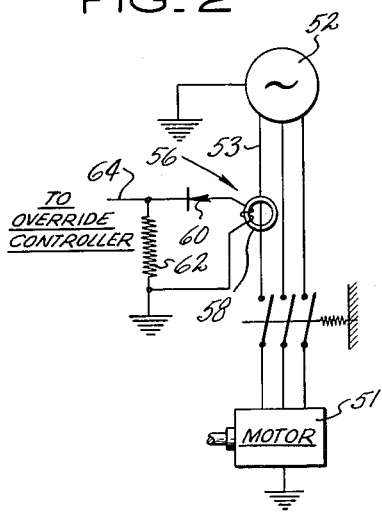
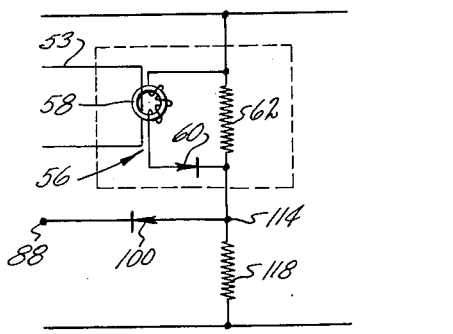
INVENTOR
CHARLES B. BRAHM
BY Harris G. Luther
ATTORNEY

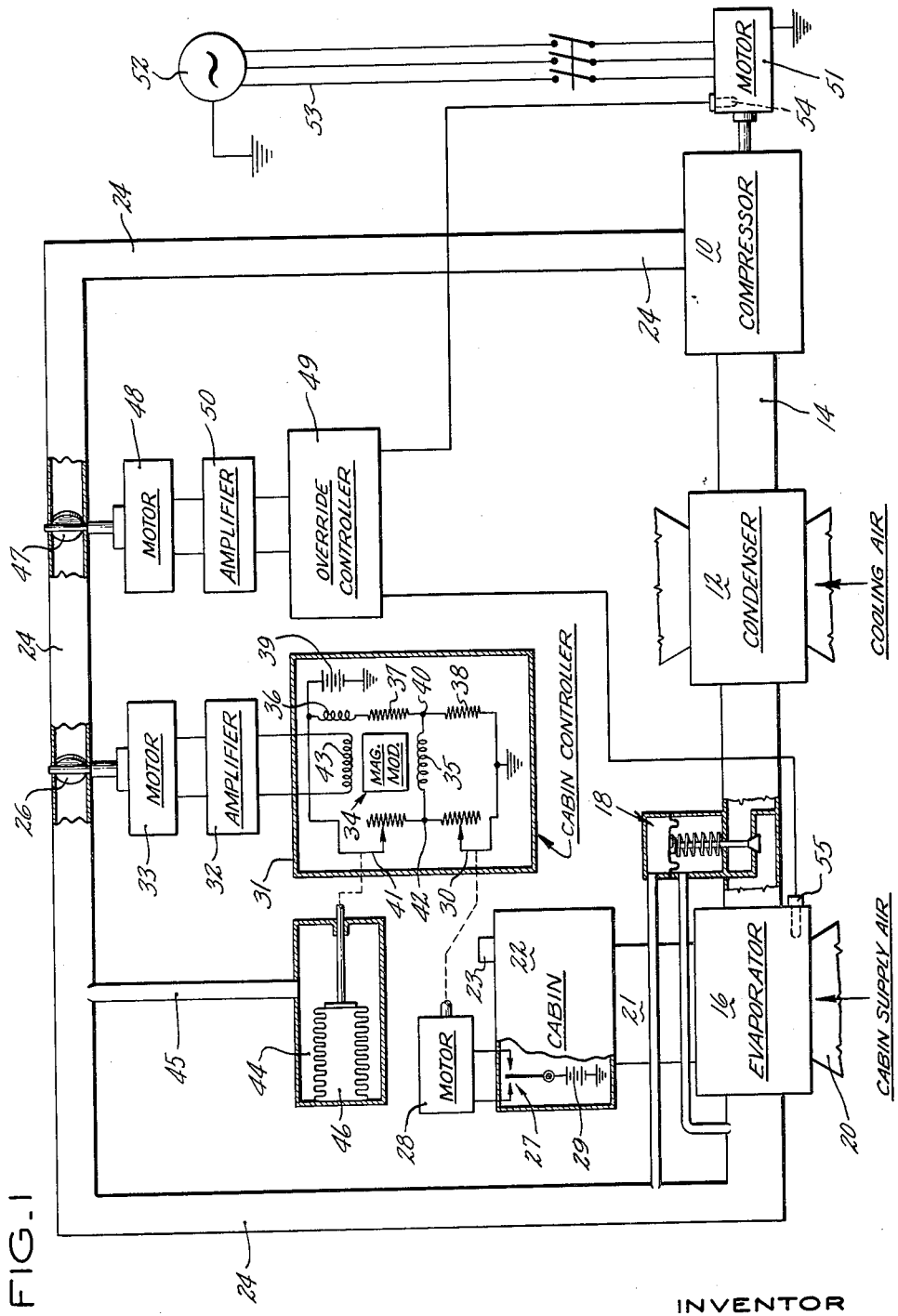

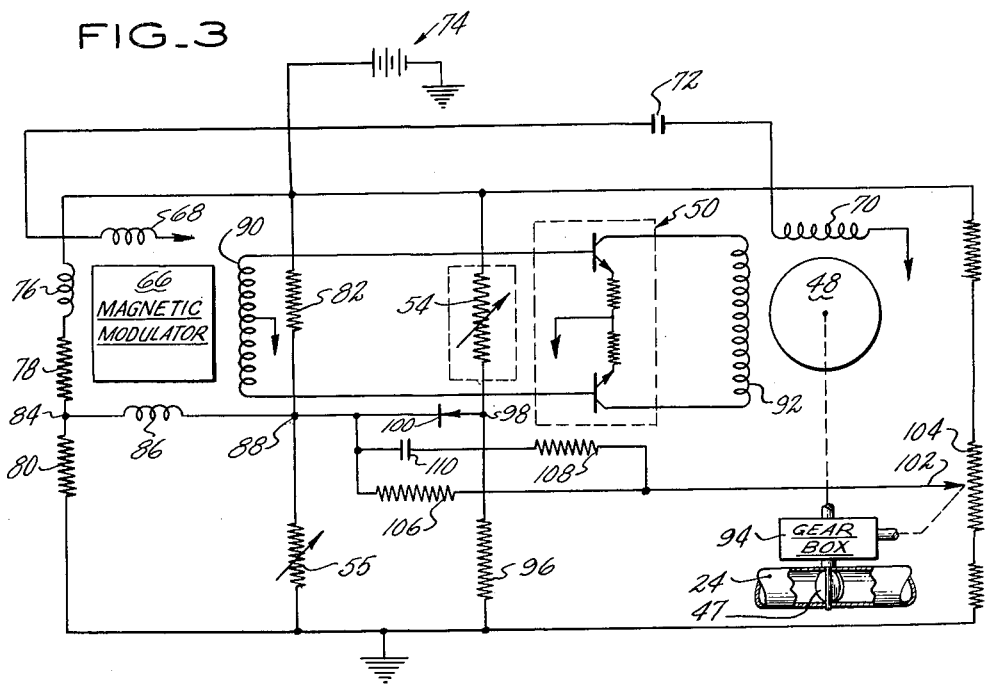
FIG_3
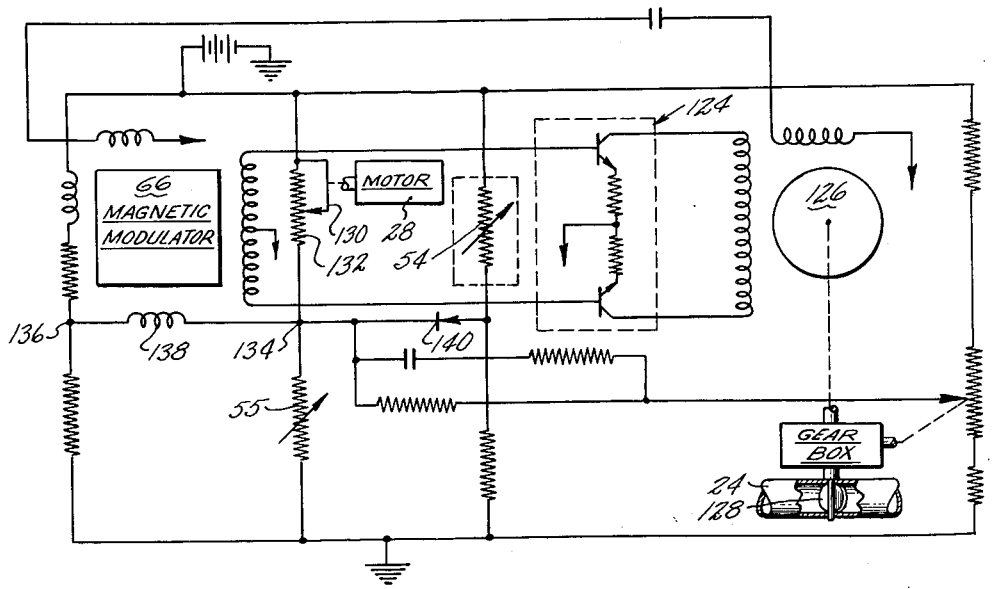
FIG_6
INVENTOR
CHARLES B. BRAHM
BY Harris G. Luchs
ATTORNEY

United States Patent Office

3,057,170
Patented Oct. 9, 1962

1

3,057,170
AIR CONDITIONING OVERLOAD PROTECTOR
Charles B. Brahm, Rockville, Conn., assignor to United
Aircraft Corporation, East Hartford, Conn., a corporation of Delaware
Filed Dec. 5, 1958, Ser. No. 778,488
13 Claims. (Cl. 62—209)

This invention relates to control mechanism and more particularly to mechanism for controlling Freon air conditioning and refrigerating systems for aircraft compartments or cabins.

The invention further relates to an air conditioning and refrigerating system having a closed refrigerant cycle including a heat exchanger, a refrigerant compressor, a conduit connecting the heat exchanger with the compressor and a variable restriction in the conduit to vary the flow of refrigerant fluid.

One of the problems in the air conditioning of aircraft compartments is that of accurately maintaining a selected temperature regardless of the rapidly varying conditions to which an aircraft is subjected.

In an air conditioning system having a circulating refrigerant using a heat exchanger for cooling the compartment air supply, the heat exchanger must be maintained at a temperature to cool the incoming air the correct amount so that the resultant air temperature will provide the selected compartment air temperature. The cooling requirements of the system vary with changes in ambient temperature. Conditions may occur where the temperature called for by the compartment will require the heat exchanger to maintain a below freezing temperature in order to supply sufficient cooling to the compartment air. Other conditions may arise where because of the large amount of refrigerant required for cooling, the refrigerant compressor motor is subjected to a heavy load and overheating.

It is therefore an object of the present invention to provide in an aircraft air conditioning system mechanism having a normal temperature control with means provided to override the normal temperature control and prevent the system from freezing up where excessively low heat exchanger temperatures are encountered.

Another object of this invention is to provide in an aircraft air conditioning system mechanism to override the normal temperature control in response to overload or overtemperature of the refrigerant compressor motor.

A futher object of this invention is to provide in an aircraft air conditioning system means to control the flow of refrigerant fluid in response to variables of operation which may exceed certain predetermined values.

Other objects and a fuller understanding of the invention may be had by referring to the following description and claims taken in conjunction with the accompanying drawings in which:

FIG. 1 is a schematic drawing showing an aircraft compartment air conditioning system including the overriding mechanism.

FIG. 2 is a schematic drawing showing a modification of the overriding mechanism in FIG. 1.

FIG. 3 is a wiring diagram of the overriding control of FIG. 1.

FIG. 4 is a modification of the wiring diagram shown in FIG. 3.

FIG. 5 is a schematic drawing showing an aircraft compartment air conditioning system including control mechanism.

FIG. 6 is a wiring diagram of the control mechanism shown in FIG. 5.

Referring to FIG. 1, the refrigerating system operates on the basic principle of vapor cycle cooling where a cooling effect is produced when a liquid is vaporized. A suitable refrigerant is one of the Freons, preferably Freon 114, whose temperature will vary in accordance with its pressure. The Freon gas passes through a compressor 10 where it is compressed, resulting in an increase in its temperature and pressure. The compressed Freon gas then enters condenser 12 through line 14 where heat is removed by cool ram air during flight or by air flow from a fan (not shown) during ground operation. As heat is removed, the gas condenses into a liquid. The heated ram or fan air utilized for cooling the Freon in the condenser is dumped overboard. The liquid Freon from the condenser is allowed to enter the evaporator section of the heat exchanger 16 through the thermostatic expansion valve 18 at a rate which will assure complete vaporization of the liquid Freon back into a gas before it leaves the evaporator. Expansion valve 18 provides a pressure drop to reduce the Freon from a high pressure liquid to a low pressure liquid which can be boiled by low temperature air. Heat is absorbed by the Freon during vaporization. The air supply from any suitable source (not shown), which may be ram air or recirculated cabin air or air from the supercharger or bleed air from a gas turbine compressor, is led through a duct 20 through evaporator 16 and line 21 into the compartment 22 to be cooled, from which it may be discharged through a relief or pressure control valve 23. The compartment 22, for convenience in terminology, has been indicated as an aircraft cabin. After leaving the evaporator the warm Freon gas is discharged back to the compressor inlet through conduit 24 where the cycle is repeated.

A throttle valve 26 of any suitable type but which is shown as a butterfly valve, controls the flow of the low pressure Freon gas through the line 24 and thus serves as a variable restriction controlling the back pressure in evaporator 16. Hence, by operating valve 26 to maintain a selected pressure in the evaporator, it is possible to maintain a selected temperature in the evaporator. Opening of the valve 26 will permit more Freon to pass through the evaporator and reduce the temperature of the cabin air correspondingly.

A thermostat or other temperature sensitive device 27 located in the compartment to be controlled, and as shown in the cabin 22, controls a reversible electric motor 28 energized by a source of power such as battery 29 to vary rheostat 30 in controller 31. When the temperature in cabin 22 is above or below the selected value, motor 28 will be actuated and variation of rheostat 30 will create a signal in controller 31 to actuate, through amplifier 32, a reversible motor 33 and move valve 26. Controller 31 includes a magnetic modulator 34 which gives an output in response to the variation in the signal across signal winding 35. A voltage divider network, including magnetic modulator bias winding 36 and resistors 37 and 38 energized by D.C. source 39, fixes the voltage at junction 40, and a second voltage divider network including rheostats 41 and 30 also energized my source 39 determines the voltage at junction 42. Magnetic modulator output winding 43 transmits the modulated signal to amplifier 32. A fuller description of the magnetic modulator and its associated circuitry is given in FIG. 3.

Movement of valve 26 changes the outlet pressure of evaporator 16, and the pressure change is sensed in chamber 44 which is connected through line 45 to conduit 24. Bellows 46 in chamber 44 responds to the pressure change and varies rheostat 41, creating in controller 31 a condition opposing the signal produced by the variation of rheostat 30.

During steady state conditions the voltage at junction 42 balances the fixed voltage at junction 40, and no signal exists across signal winding 35. Should cabin 22 call for more cooling, movement of rheostat 30 will cause a change in the voltage at junction 42 and create a signal across winding 35 to cause valve 26 to open. Opening of valve 26 allows more fluid to flow for cooling cabin 22 and lowers the pressure in chamber 44 which varies rheostat 41 in the direction to restore junction 42 to its original voltage and eliminate the valve opening signal across winding 35.

Valve 26 will continue to open as long as a potential difference exists across signal winding 35, and motor 28 will continue to vary rheostat 30 until the temperature called for in cabin 22 is attained. When the pressure in chamber 44 reaches a value resulting in a balancing of the voltages at junctions 42 and 40, a new steady state condition has been reached. Controller 31 will thus actuate valve 26 to rebalance the system in response to either temperature error signals from cabin 22 or pressure error signals from chamber 44.

An additional valve 47 is positioned in conduit 24 and controlled by reversible motor 48 in response to a signal supplied by override controller 49 through amplifier 50. The compressor motor 51 which is energized by a source of power 52 through line 53 has associated with it a thermistor 54 which supplies a signal to the override controller 49 in response to the temperature of said compressor motor. A second thermistor 55 associated with evaporator 16 supplies a temperature signal to the override controller 49. Valve 47 is normally open to allow free flow of Freon through the conduit. Override controller 49 will be actuated only when the temperature of the air in evaporator 16 approaches such a low temperature that the evaporator and the lines between the evaporator and the cabin 22 become coated with frost or when the temperature in compressor motor 51 becomes excessive. When either of these situations occur, the override controller 49 will provide a signal through amplifier 50 to actuate motor 48 and close valve 47 until the particular condition has been restored to a normal value.

It can therefore be seen that the flow of Freon through the refrigerating system can be controlled either by valve 26 or by valve 47 and that unless undesirable conditions of operation arise, valve 47 will remain completely open and the normal operation of the system controlled by valve 26.

FIG. 2 shows a modification of the overriding mechanism of FIG. 1. Thermistor 54 in the compressor motor 51 has been eliminated and a current responsive pickup indicated generally at 56 has been inserted in a compressor motor supply line 53 to sense the load on compressor motor 51. The current responsive pickup includes a transformer 58 in which the voltage output is proportional to the current in line 53. The voltage output is passed through the rectifier 60 and across resistor 62 where the voltage is transmitted to override controller 49 by line 64. Override controller 49 thus receives signals from evaporator thermistor 55 and pickup 56 and will be actuated only when the temperature in evaporator 16 approaches freezing or when the load impressed on compressor motor 51 is excessive.

FIG. 3 shows electronically the operation of the override controller schematically identified as 49 in FIG. 1. Magnetic modulator 66 is energized by an alternating current signal impressed on exciter winding 68. The same A.C. signal actuates winding 70 of reversible motor 48 through capacitor 72, and the signal impressed on winding 70 is therefore 90° out-of-phase with that on winding 68. A D.C. signal source 74 supplies energy through magnetic modulator bias winding 76 and voltage divider network resistors 78 and 80. The direct current is also supplied through the voltage divider network including thermistor 55 and fixed resistor 82. Junction 84 will be at a fixed potential and is connected through signal winding 86 to junction 88. Fixed resistor 82 is chosen such that the voltage at junction 88 under normal operating conditions will be lower than the voltage of junction 84 and a continuous signal will pass from the more positive junction 84 to junction 88.

When the temperature of the air in evaporator 16 in which thermistor 55 is located approaches freezing, the resistance of thermistor 55 will increase, and the voltage at junction 88 will increase and eventually become more positive than the voltage of junction 84. Magnetic modulator output winding 90 takes the output of magnetic modulator 66 and transmits the signals to winding 92 of reversible motor 48 through amplifier 50. The polarity of the signal across signal winding 86 will determine the direction in which reversible motor 48 is actuated. Under normal operating conditions the polarity of the signal is such that motor 48 working through gearbox 94 will retain valve 47 in its full open position and when, due to the decrease in temperature of evaporator 16, junction 88 becomes more positive and a reverse signal is impressed across signal winding 86, motor 48 will begin closing valve 47.

Also in FIG. 3, another voltage divider network includes compressor motor thermistor 54 schematically shown in FIG. 1 and a fixed resistor 96 whose junction 98 is connected through rectifier 100 to junction 88. Fixed resistor 96 is chosen such that under normal operating conditions junction 98 will be less positive than junction 88, but when the temperature in the compressor motor 51 reaches a predetermined high level, thermistor 54 will decrease in resistance and junction 98 will become more positive and eventually overcome the reverse bias on rectifier 100 and override the voltage of junction 88. Junction 88 will then be more positive than junction 84 and motor 48 will start closing valve 47 to eliminate the conditions which caused the overheating of compressor motor 51. Any movement of motor 48 will be transmitted through gearbox 94 to arm 102 which varies the voltage picked off from potentiometer 104 and fed back to junction 88 through the network including resistors 106 and 108 and capacitor 110. This negative feedback will enable the movement of valve 47 to be monitored and overshoot of valve 47 will be prevented.

FIG. 4 shows a modification of FIG. 3. Thermistor 54 of FIG. 3 has now been replaced by current responsive pickup 56, shown in FIG. 2. The signal fed to junction 88 through rectifier 100 is a composite of the voltage divider signal at junction 114 and the signal caused by current responsive pickup 56.

The fixed signal at junction 114 is the result of the voltage drop across resistors 62 and 118, which resistors are chosen so that the normal signal at junction 114 is more negative than the signal at junction 88 and is prevented from reaching junction 88 by the reverse bias of rectifier 100.

When the current in line 53 becomes high, the positive voltage produced by transformer 58 through rectifier 60 will add to the voltage of junction 114 and overcome the reverse bias of rectifier 100. When this occurs, junction 88 will be forced more positive creating a signal across winding 86 in a direction to cause motor 48 to close valve 47, reducing the Freon flow and eliminating the compressor overload. The overload protection also prevents any undesirable drain of current from the aircraft power supply.

A simplified method of override control is shown schematically in FIG. 5. The air in cabin 22 is cooled by evaporator 16 as in FIGS. 1 and 2. Temperature sensing device 27 in cabin 22 actuates reversible motor 28 when the temperature in the cabin is over or under a selected value and the motor 28 modifies the signal produced by the controller 122, shown in detail in FIG. 6. This controller signal, through amplifier 124 and reversible motor 126, actuates valve 128 and varies the fluid flow through conduit 24. Compressor motor thermistor 54 and evaporator thermistor 55 supply temperature signals to controller 122.

In FIG. 6, the controller comprises reversible motor 28 connected to arm 130 which moves the arm to vary the resistance of resistor 132, which in turn will change the voltage at junction 134. The voltage at junction 136 is fixed at a constant positive value and variation of the voltage of junction 134 above or below the voltage of junction 136 will determine the direction of the signal across signal winding 138 to actuate motor 126 to either open or close valve 128. Thus it can be seen that the actuation of motor 28 in response to the temperature in cabin 22 will determine the signal impressed on magnetic modulator 66 and the direction of movement of valve 128. Thermistor 55 eventually responds to the change in evaporator temperature and rebalances the voltage at junction 134 with the voltage at junction 136, at which time no further signal is produced across signal winding 138.

If the temperature of the air in evaporator 16 of FIG. 5 approaches freezing, the resistance of thermistor 55 increases and junction 134 is forced more positive than junction 136, resulting in a continuous signal in the direction that will close valve 128. The compressor motor thermistor 54 performs its overriding function through rectifier 140 as previously described. It is obvious that the current responsive pickup 56 shown in FIG. 4 can replace thermistor 54. Thus it can be seen that the functions of cabin temperature control and override have been combined in controller 122.

In operaion, the over- or undertemperature of cabin 22 in FIG. 5 will actuate motor 28, to vary the resistance of 132 a limited amount and the variation of resistance of resistor 132 by the movement of arm 130 by motor 28 will create signals across the signal winding 138 to open or close the valve 128 and vary the flow of refrigerant fluid through conduit 24, thus varying the temperature in evaporator 16 and restoring the temperature in cabin 22 to its prescribed value. As the variation of resistance 132 in a direction to reduce cabin temperature is limited this control will be overridden by an excessively low temperature in evaporator 16 or an overtemperature in compressor motor 51. The temperature of the evaporator may be transformed into electrical signals by the thermistor 55 as shown or by pressure responsive mechanism such as at 41, 44, 45 and 46 of FIG. 1 which may be substituted for the thermistor 55 in FIG. 6.

Although the invention has been described in its preferred form with a certain degree of particularity, it is understood that the disclosure of the preferred form has been made only by way of example and that changes in the details of the construction and the combination and arrangement of parts may be resorted to without departing from the spirit and the scope of the invention as hereinafter claimed.

What is claimed is:

1. In a refrigerating system, a coolant conducting circuit including a refrigerant evaporator and a compressor, the outlet of said compressor being connected to the inlet of said evaporator, a conduit connecting said evaporator outlet with said compressor inlet, means responsive to the outlet pressure of said evaporator for varying the flow of coolant through said circuit, a motor for driving said compressor, and means responsive to the temperature of said compressor motor for overriding said pressure responsive means and varying the flow of coolant through said circuit.

2. Control means for a refrigerating system having a motor driven compressor, a refrigerant evaporator receiving the output of said compressor and delivering expanded refrigerant to the compressor inlet, and a valve controlling the evaporator back pressure, comprising, means producing control signals responsive to variations of the temperature of said evaporator from a preselected value, a valve actuating motor, converter means converting said control signals into valve motor actuating energy, means continuously supplying said control signals to said converter means, means responsive to a condition of operation of said compressor motor for supplying overriding signals to said converting means, means creating a negative feedback signal responsive to the rate of movement of said valve actuating motor, and means connecting said feedback signal with said converting means.

3. In a coolant system, a coolant conducting circuit including heat exchange means and coolant pumping means, an expansion valve and flow control means in said circuit, means responsive to selected system conditions for actuating said flow control means and varying the flow of coolant through said circuit, and means responsive to a condition of operation of said heat exchange means and said coolant pumping means to override said flow control actuating means.

4. In a refrigerating system for regulating the temperature in an enclosure, a motor driven compressor, a refrigerant evaporator, a conduit connecting said evaporator outlet with said compressor inlet, a variable restriction in said conduit including a valve, a first motor for actuating said valve, means for sensing a variation in said enclosure temperature from a preselected value, a second motor responsive to said temperature variations, a controller responsive to said second motor movement for producing a signal to actuate said first motor, means for producing a signal responsive to evaporator temperature, and means for producing a signal responsive to compressor motor temperature, said controller receiving said evaporator and compressor motor temperature signals and converting said signals into first motor actuating signals for overriding said enclosure temperature signals when said compressor motor and evaporator temperature signals vary from a preselected value.

5. In a refrigerating system, in combination, a refrigerant evaporator, a compressor, a conduit connecting said evaporator outlet with said compressor inlet, flow control means to vary the flow of refrigerant through said conduit responsive to the outlet pressure of said evaporator, additional means to vary the refrigerant flow through said conduit responsive to evaporator temperature, an electric motor to drive said compressor and means responsive to the electrical input to said motor to override said additional means and control the fluid flow through said conduit.

6. In a refrigerating system for regulating the temperature of an enclosure, a motor driven compressor, an evaporator, a conduit connecting said evaporator outlet with said compressor inlet, a valve controlling the fluid flow in said conduit, a motor for actuating said valve, means for producing a signal responsive to evaporator outlet pressure, a temperature sensing device in said enclosure producing a signal responsive to variations in temperature from a preselected value, a controller for receiving said pressure and temperature signals and transforming said signals into valve motor movement, a second valve controlling the fluid flow in said conduit, said second valve normally being fully open, a motor for actuating said second valve, means for producing a signal responsive to evaporator temperature, means for producing a signal responsive to compressor motor temperature, and a second controller responsive to said evaporator and compressor motor temperature signals for actuating said second valve motor and controlling said fluid flow.

7. In a refrigerating system, a refrigerant evaporator, a compressor, the outlet of said compressor being connected with the inlet of said evaporator, a conduit connecting said evaporator outlet with said compressor inlet, a first valve for controlling the fluid flow in said conduit, means responsive to the variations of said evaporator outlet pressure from a preselected value producing an error signal, means responsive to said error signal for moving said valve and eliminating said error signal, a second valve for controlling the fluid flow in said conduit, means responsive to decrease of evaporator temperature below a preselected datum temperature producing a second error signal, means responsive to said second error signal for moving said second valve and eliminating said second error signal, a motor to drive said compressor, and means responsive to increase of the load on said compressor motor above a preselected datum for producing a third error signal and means responsive to said third error signal for moving said second valve and eliminating said third error signal.

8. In a refrigerating system for controlling the temperature of an enclosure, including a refrigerant compressor connected with an evaporator in heat transferring relation with said enclosure, and an expansion valve connected between said compressor and said evaporator, means responsive to the enclosure temperature for controlling flow in the connection between said evaporator and said compressor, means responsive to the evaporator temperature also controlling flow in the connection between said compressor and said evaporator, and means responsive to an operating condition of said compressor motor for overriding said temperature responsive controls.

9. In a refrigerating system for controlling the temperature of an enclosure, including a motor driven refrigerant compressor connected with an evaporator in heat transferring relation with said enclosure, and an expansion valve between said compressor and said evaporator, flow control means connected between said evaporator and said compressor, means responsive to the enclosure temperature producing a first signal, means responsive to the evaporator temperature producing a second signal, means combining said first and second signals and producing a control signal, means connecting said control signal with said flow control means to actuate said flow control means in response to said control signal, and means responsive to an operating condition of said compressor motor for overriding said control signal and closing said flow control means.

10. In a refrigerating system for controlling the temperature of an enclosure, a coolant conducting circuit including heat exchange means and coolant pumping means, an expansion valve and flow control means in said circuit, means responsive to the temperature of the enclosure for actuating said flow control means and varying the flow of coolant through said circuit, means responsive to the temperature adjacent said heat exchange means for actuating said flow control means to reduce the cooling of said system when the temperature adjacent said heat exchange means approaches freezing, and means responsive to a condition of operation of said coolant pumping means to override said flow control actuating means.

11. In a refrigerating system for regulating the temperature of an enclosure, a refrigerant evaporator, a compressor, a conduit connecting said evaporator outlet with said compressor inlet, a motor for driving said compressor, first and second back pressure valves in said conduit, means responsive to the temperature of said enclosure for controlling said first valve, and means responsive to the temperature of said evaporator for controlling said second valve.

12. In a refrigerating system according to claim 11, means responsive to a condition of operation of said compressor motor for overriding said evaporator temperature responsive means and controlling said second valve.

13. In a refrigerating system for regulating the temperature of an enclosure, a refrigerant evaporator, a compressor, a conduit connecting said evaporator outlet with said compressor inlet, a motor for driving said compressor, first and second back pressure valves in said conduit, means responsive to the temperature of said enclosure for producing a first signal, means responsive to the outlet pressure of said evaporator for producing a second signal, means for combining said first and second signals to control said first valve, and means responsive to a condition of operation of said compressor motor for controlling said second valve.

References Cited in the file of this patent

UNITED STATES PATENTS

| | | |
|---|---|---|
| 2,227,244 | Candor | Dec. 31, 1940 |
| 2,282,385 | Shawhan | May 12, 1942 |
| 2,282,880 | Oergel | May 12, 1942 |
| 2,400,335 | Dodson | May 14, 1946 |
| 2,484,156 | Dube | Oct. 11, 1949 |
| 2,817,213 | Miner | Dec. 24, 1957 |
| 2,932,176 | Farkas | Apr. 12, 1960 |